US012693627B2

(12) United States Patent
Park et al.

(10) Patent No.: US 12,693,627 B2
(45) Date of Patent: Jul. 28, 2026

(54) WIGNER INVERSE TRANSFORM BASED COMPUTER GENERATED HOLOGRAM FOR LARGE OBJECT AT FAR FIELD FROM ITS PERSPECTIVE LIGHT FIELD

(71) Applicant: Inha University Research and Business Foundation, Incheon (KR)

(72) Inventors: Jae Hyeung Park, Incheon (KR); Kyosik Min, Incheon (KR); Dabin Min, Incheon (KR)

(73) Assignee: Inha University Research and Business Foundation, Incheon (KR)

( * ) Notice: Subject to any disclaimer, the term of this patent is extended or adjusted under 35 U.S.C. 154(b) by 316 days.

(21) Appl. No.: 18/376,477

(22) Filed: Oct. 4, 2023

(65) Prior Publication Data

US 2024/0272586 A1    Aug. 15, 2024

(30) Foreign Application Priority Data

Feb. 9, 2023    (KR) ........................ 10-2023-0017281

(51) Int. Cl.
G03H 1/08      (2006.01)
G03H 1/16      (2006.01)

(52) U.S. Cl.
CPC ................. G03H 1/16 (2013.01); G03H 1/08 (2013.01)

(58) Field of Classification Search
CPC .... G03H 1/16; G03H 1/08; G03H 2001/0204; G03H 1/0808; G03H 1/268
USPC ....................................................... 359/9, 29
See application file for complete search history.

(56) References Cited

U.S. PATENT DOCUMENTS 6,490,088 B1 * 12/2002 Rosen ...................... G02B 5/32
                                                                359/9
2023/0393525 A1 * 12/2023 Brac De La Perriere ...................
                                                                G03H 1/0808

FOREIGN PATENT DOCUMENTS

KR      10-2012-0110218       10/2012
KR      10-2020-0064478       6/2020

OTHER PUBLICATIONS

"Fresnel and Fourier hologram generation using orthographic projection images", Park et al Optics Express vol. 17, No., 8 pp. 6320-6633 (Year: 2009).*
"Hologram Generation of 3D Objects Using multiple Orthographic View Images" by Kim et al> Journal of the Optical Society of Korea vol. 12, No. 4 (Year: 2008).*

(Continued)

*Primary Examiner* — Audrey Y Chang
(74) *Attorney, Agent, or Firm* — CAHN & SAMUELS, LLP

(57)                    ABSTRACT

Wigner inverse transform based hologram synthesis method and system using large three-dimensional objects at a far distance from its perspective light field is proposed. A Wigner inverse transform based hologram synthesis method using large three-dimensional objects at a far distance from its perspective light field proposed in the present disclosure includes collecting perspective views in front focal plane corresponding to orthographic views in back focal plane, synthesizing an intermediate hologram in the back focal plane by treating and using the collected perspective views as orthographic views without adjustment and modification of the view for the collected perspective views, and synthesizing a final hologram in the front focal plane corresponding to original perspective views by taking Fourier transform of the synthesized intermediate hologram.

10 Claims, 11 Drawing Sheets

(56)                         References Cited

OTHER PUBLICATIONS

Kyosik Min et al. "Wigner inverse transform based computer generated hologram for large object at far field from its perspective light field," Optics Communications 532 (2023) 129229, pp. 1-13.
Xu Zhang et al. "Resolution-enhanced holographic stereogram based on integral imaging using an intermediate-view synthesis technique," Optics Communications 457 (2020) 124656, pp. 1-6.
English Abstract of KR 10-2012-0110218, Oct. 10, 2021.
English Abstract of KR 10-2020-0064478, Jun. 23, 2020.
Park, "Efficient calculation scheme for high pixel resolution non-hogel-based computer generated hologram from light field," Opt. Express 28, 6663-6683 (2020).

* cited by examiner

Current algorithm
(CG rendering program)

FIG. 3

Orthographic view
$O_{u,v}(t_x, t_y)$ $$\sum_{u,v} O_{u,v}(t_x, t_y)$$

Orthographic view
$L(t_x, t_y, u, v)$

Fourier Transform $$\tilde{O}_{\tau_x, \tau_y}(t_x, t_y) = \tilde{L}(t_x, t_y, \tau_x, \tau_y)$$

Multiplying weight $$H_{\tau_x, \tau_y}\left(t_x + \frac{\tau_x}{2}, t_y + \frac{\tau_y}{2}\right) = \tilde{O}_{\tau_x, \tau_y}(t_x, t_y)\, W\left(t_x - \frac{\tau_x}{2}, t_y - \frac{\tau_y}{2}\right)$$

Accumulating

Final hologram $$H(x,y) = \iint H_{\tau_x, \tau_y}(x, y)\, d\tau_x d\tau_y$$

WIGNER INVERSE TRANSFORM BASED COMPUTER GENERATED HOLOGRAM FOR LARGE OBJECT AT FAR FIELD FROM ITS PERSPECTIVE LIGHT FIELD

This application claims the priority benefit of Korean Patent Application No. 10-2023-0017281, filed on Feb. 9, 2023, in the Korean Intellectual Property Office, the disclosure of which is incorporated herein by reference.

BACKGROUND

1. Field of the Invention

The present disclosure relates to Wigner inverse transform based hologram synthesis method and system using large three-dimensional objects at a far distance from its perspective light field.

This work was supported by Institute of Information & communications Technology Planning & Evaluation (IITP) grant funded by the Korea government (MSIT) (2021-0-00091 (Development of real-time high-speed renderer technology for ultra-realistic hologram generation)).

2. Description of Related Art

Computer generated holograms (CGHs) of three-dimensional (3D) objects are used in diverse applications including 3D holographic displays and printings. 3D digital objects are represented in various forms and the corresponding holograms are synthesized by physical diffraction calculation, iterative optimization, or neural network. One of the 3D object representation forms frequently used in the CGH techniques is light field. Light field is a collection of the views of the 3D objects, containing ray information emitted from individual object points.

FIGS. 1A-1B are drawings for describing light filed field displayed with an orthogonal view array and a perspective view array according to prior art.

FIG. 1A represents light field displayed with an orthogonal view array, and FIG. 1B represents light field displayed with a perspective view array.

From a light field $L(t_x,t_y,u,v)$, each orthogonal view $O_{uo,vo}(t_x,t_y)=L(t_x,t_y,u_o,v_o)$ is obtained by capturing spatial ray information $(t_x,t_y)$ at a fixed ray angle $(u_o,v_o)$. Each perspective view $P_{txo,tyo}(u,v)=L(t_{xo},t_{yo},u,v)$ is obtained by capturing angular ray information $(u,v)$ at a fixed spatial position $(t_{xo},t_{yo})$. U in the right top box of FIG. 1A and FIG. 1B represents a collection.

As FIGS. 1A-1B, the views constituting the light field may have orthographic projection geometry where the captured rays in each view are parallel or perspective projection geometry where they converge at the corresponding camera center. Compared to other possible forms such as point cloud, depth layers, and polygon meshes, the light field has advantages in which it has occlusion, refraction, and surface diffusion characteristics by itself and thus the CGH synthesized from the light field naturally exhibits those characteristics. Also, the light field may be obtained easily from numerous computer graphics (CG) rendering software or optically captured using an array of cameras or lenses.

In order to synthesize CGHs from light field, hogel-based techniques have been proposed. The traditional hogel-based method divides the hologram plane into multiple non-overlapping areas, called hogels, and then assigns the view multiplied with random phase to the corresponding hogels. The wavefront reconstructed using this is only discrete, and it also suffers from the spatio-angular resolution trade-off, prohibiting high resolution reconstruction. In order to overcome this limitation, a CGH synthesis technique using a light field and its depth map has been reported. While this method successfully synthesizes the CGH from the light field overcoming the trade-off relation, the necessity of the depth map may be considered as a limitation. The depth map of a light field is generally hard to obtain in real scene. Although the depth map estimation techniques from a light field have been proposed, the estimated depth map usually has errors which deteriorate the reconstruction quality of the hologram. A ray-wavefront conversion technique based on the additive compressive light field was also proposed, but the hologram is synthesized from the compressed light field which approximates the actual light field.

Recently, a Wigner inverse transform based light field hologram (WignerLFH) method has been proposed. The WignerLFH method reconstructs a continuous spherical wavefront for each object point, enabling high resolution reconstruction overcoming the limitation imposed by the spatio-angular resolution trade-off. The feature of the WignerLFH method is that it does not require the depth map. A light field implicitly contains the depth information of the objects as a form of the disparity between the views constituting the light field. The WignerLFH method synthesizes the CGH in a way that the implicitly contained depth information is automatically implemented in the synthesized hologram, reconstructing continuous spherical wavefront for individual object points. A complete control on the carrier wave, or stated differently, an arbitrary assignment of the object's initial phase distribution is another advantage.

However, the previously proposed WignerLFH method is applicable only in the light field that consists of the orthographic views of the objects as shown in FIG. 1A. This limitation comes from the fact that the WignerLFH method requires the spatial pixel count of the light field same as resolution of the synthesized hologram.

PRIOR ART DOCUMENTS

Patent Documents

[1] J.-H. Park, "Efficient calculation scheme for high pixel resolution non-hogel-based computer generated hologram from light field," Opt. Express 28, 6663-6683 (2020)

SUMMARY

The technical problem to be achieved by the present disclosure is to extend the WignerLFH technique to a perspective light field for real scene hologram in an effective and simple manner. The proposed method synthesizes a hologram of 3D objects from perspective light field by using a simple geometric relationship between the perspective and orthographic views.

According to one aspect, a Wigner inverse transform based hologram synthesis method using large three-dimensional objects at a far distance from its perspective light field proposed in the present disclosure includes collecting perspective views in front focal plane corresponding to orthographic views in back focal plane, synthesizing an intermediate hologram in the back focal plane by using the collected perspective views as an orthographic view array without adjustment and modification of the view for the collected perspective views, and synthesizing a final hologram in the front focal plane corresponding to original perspective views by taking Fourier transform of the synthesized intermediate hologram.

The collecting perspective views in front focal plane corresponding to orthographic views in back focal plane collects the perspective views $P_{tx,ty}(u,v)$ in the front focal plane in spatial coordinates $(t_x, t_y)$ in the hologram plane.

The synthesizing an intermediate hologram in the back focal plane by using the collected perspective views as an orthographic view array without adjustment and modification of the view for the collected perspective views treats the perspective views $P_{tx,ty}(u,v)$ as orthographic views $O_{u',v'}(t'_x, t'_y)$, obtains orthographic light field $L(t'_x,t'_y,u',v')$ from the orthographic views, and then performs Fourier transform and synthesizes the intermediate hologram by multiplying a shifted carrier wave term.

The synthesizing a final hologram in the front focal plane corresponding to original perspective views by taking Fourier transform of the synthesized intermediate hologram performs Fourier transform by using spatial frequency for the synthesized intermediate hologram, and synthesizes the final hologram.

According to one aspect, a Wigner inverse transform based hologram synthesis system using large three-dimensional objects at a far distance from its perspective light field proposed in the present disclosure includes a collecting unit for collecting perspective views in front focal plane corresponding to orthographic views in back focal plane, and a hologram synthesizing unit for synthesizing an intermediate hologram in the back focal plane by using the collected perspective views as an orthographic view array without adjustment and modification of the view for the collected perspective views, and synthesizing a final hologram in the front focal plane corresponding to original perspective views by taking Fourier transform of the synthesized intermediate hologram.

According to example embodiments of the present disclosure, through a simple but effective method to extend the WignerLFH technique to a perspective light field for real scene hologram, a hologram of the 3D objects may be synthesized from the perspective light field by using a simple geometric relationship between the perspective and orthographic views. The use of the perspective light field enables the hologram synthesis of large-size real objects at a far distance, and the utilization of the WignerLFH technique ensures high-resolution hologram synthesis over the traditional hogel-based techniques.

BRIEF DESCRIPTION OF THE DRAWINGS

These and/or other aspects, features, and advantages of the disclosure will become apparent and more readily appreciated from the following description of embodiments, taken in conjunction with the accompanying drawings of which:

FIG. 3 is a drawing for describing a non-hogel-based technique using orthographic views according to prior art;

DETAILED DESCRIPTION

Wigner inverse transform based light field computer generated hologram (WignerLFH) synthesizes complex optical field of three-dimensional objects from its view array without a depth map. Higher resolution than the traditional hogel-based methods, complete control on the carrier wave, and no need for the depth map are its major advantages. However, the WignerLFH method may be used only in the orthographic view array which prohibits its application to real scene and limits the depth range only around the hologram plane. In the present disclosure, a novel Wigner-LFH technique using perspective projection geometry is proposed. The proposed technique synthesizes a hologram of large three-dimensional objects at a far distance from its perspective views.

In the present disclosure, a simple but effective method to extend the WignerLFH technique to a perspective light field for real scene hologram is proposed. Using a simple geometric relationship between the perspective and orthographic views, the proposed method synthesizes a hologram of the 3D objects from their perspective light field. The use of the perspective light field enables the hologram synthesis of large-size real objects at a far distance. The utilization of the WignerLFH technique ensures high-resolution hologram synthesis over the traditional hogel-based techniques. Hereinafter, embodiments of the present disclosure will be described in detail with reference to the accompanying drawings.

Figure 1A:
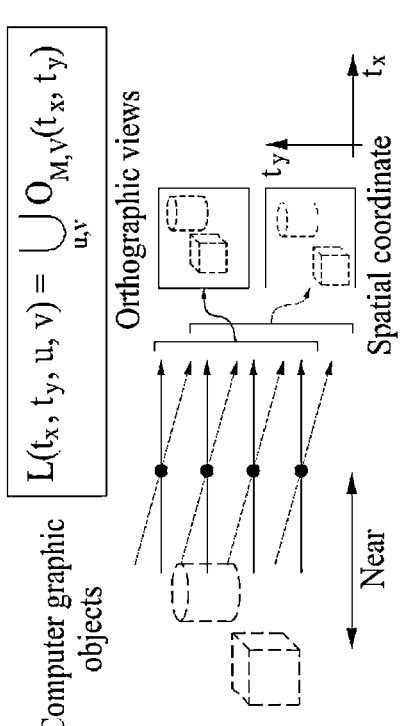
FIG. 1A represents light field displayed with an orthogonal view array.
Figure 1B:
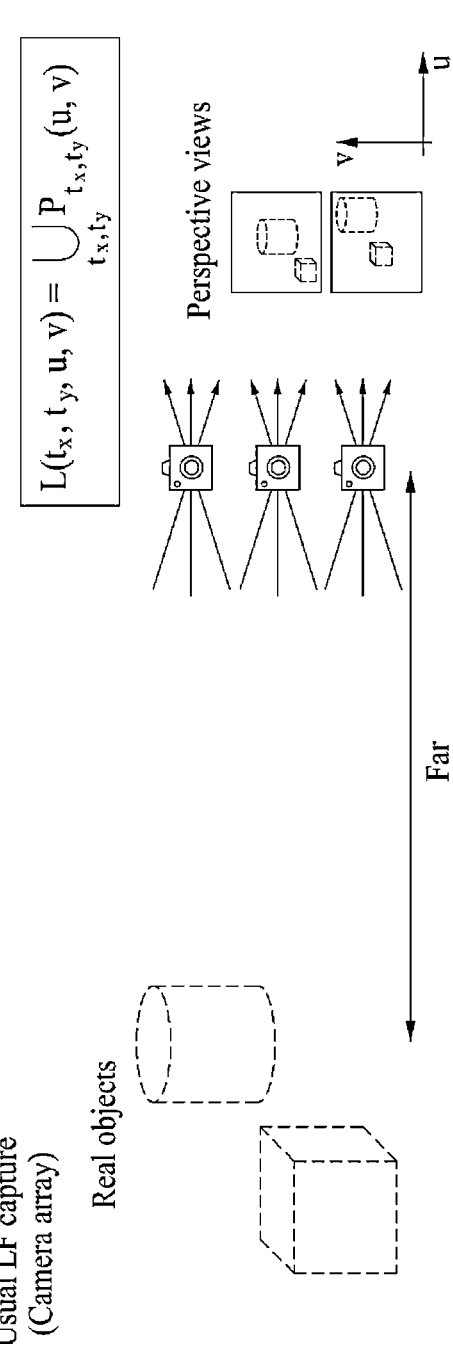
FIG. 1B represents light field displayed with a perspective view array.
Figure 2A:
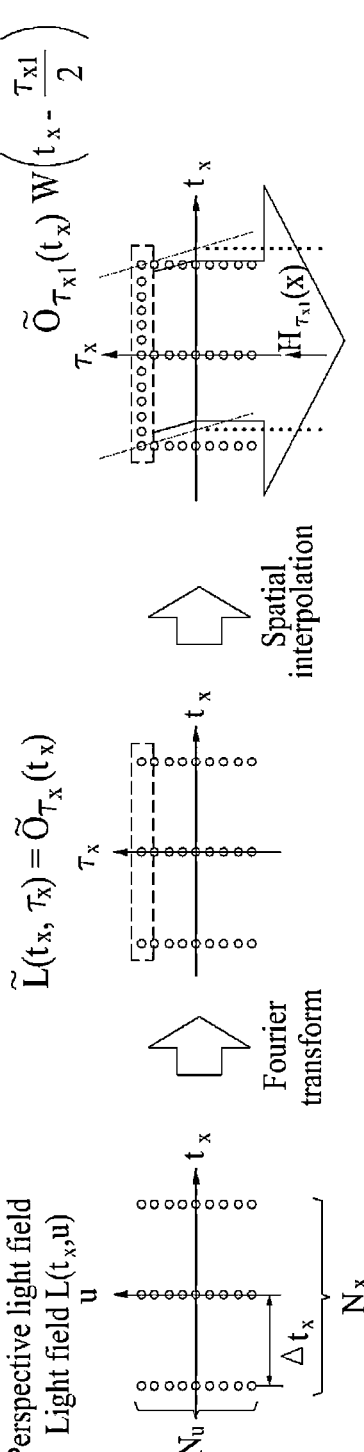
FIG. 2A illustrates the sampling grid and required spatial interpolation for the WignerLFH in a perspective light field.
Figure 2B:
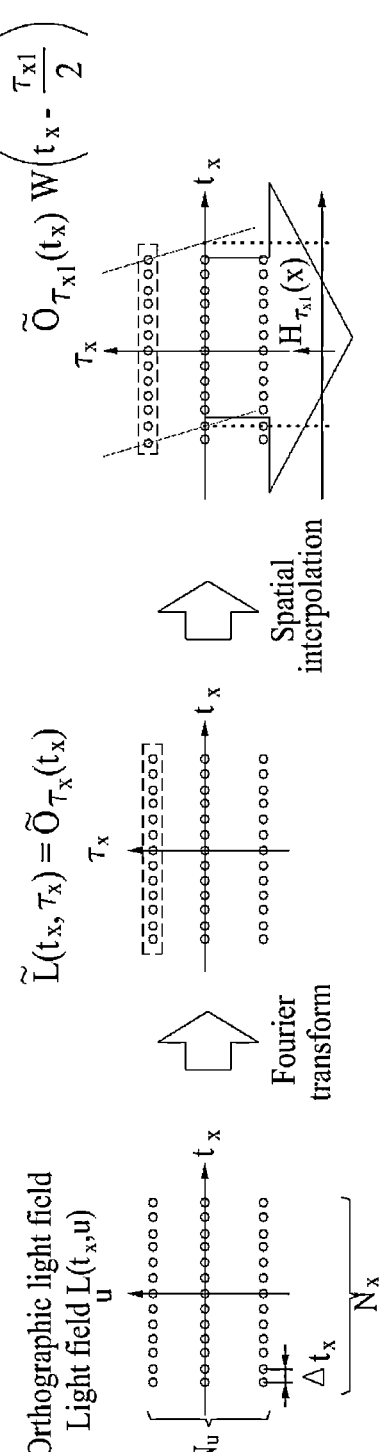
FIG. 2B illustrates the sampling grid and required spatial interpolation for the WignerLFH in an orthographic light field.

FIGS. 2A-2B are drawings for describing sampling grid and required spatial interpolation according to one example embodiment of the present disclosure.

The proposed method is an expansion of the traditional WignerLFH method. Let represent spatial coordinates in hologram plane as $(t_x, t_y)$ or $(x,y)$. Angular coordinates are expressed as spatial frequencies $(u,v)$ of $(\theta_x, \theta_y)$, i.e., $(u,v)=(\sin \delta_x/\lambda, \sin \theta_y/\lambda)$, where $\lambda$ is a wavelength. Wigner distribution function $WDF(t_x,t_y,u,v)$ is a spatial-angular Fourier transform of a complex optical field $U(x,y)$. From Wigner distribution function, the complex optical field $U(x, y)$ may be obtained with a complex constant $U^*(x_c,y_c)$ by taking Wigner inverse transform as follows.

$$U(x, y)U^*(x_c, y_c) =$$

$$\iint WDF(t_x, t_y, u, v)\exp[j2\pi(u\tau_x + v\tau_y)]dudv\big|_{t_x=\frac{x+x_c}{2}, t_y=\frac{y+y_c}{2}, \tau_x=x-x_c, \tau_y=y-y_c}. \quad (1)$$

Inspired by the Wigner inverse transform, the WignerLFH calculates an elementary hologram H(x, y; $x_c$,$y_c$) as follows.

$$H(x, y; x_c, y_c) = \iint L(t_x, t_y, u, v)\exp[j2\pi(u\tau_x + v\tau_y)]dudv\big|_{t_x=\frac{x+x_c}{2}, t_y=\frac{y+y_c}{2}, \tau_x=x-x_c, \tau_y=y-y_c}. \quad (2)$$

In Equation (2), $L(t_x,t_y,u,v)$ is the light field which represents the spatio-angular distribution of the light ray. The final hologram H(x,y) is obtained as follows.

$$H(x, y) = \iint H(x, y; x_c, y_c)W(x_c, y_c)dx_c dy_c, \quad (3)$$

where $W(x_c,y_c)$ is an arbitrary complex field which represents the carrier wave illuminating the object. The WignerLFH given by Equations (2) and (3) synthesizes the complex optical field of 3D objects with continuous parabolic wave for each object point included in the light field. Also, the WignerLFH does not require any depth information of the objects. The depth information implicitly included in the light field is automatically considered in Equations (2) and (3), and generates the final hologram by multiplying with an arbitrary carrier wave W.

Let represent 2D Fourier transform of the light field $L(t_x,t_y,u,v)$ to (u,v) as $\tilde{L}(t_x, t_y, \tau_x, \tau_y)$, where ($\tau_x$, $\tau_y$) are Fourier transformed axes of the (u,v), and through this, Equations (2) and (3) may be reorganized as follows.

$$H(x, y) = \iint H_{\tau_x,\tau_y}(x, y)d\tau_x d\tau_y, \quad (4)$$

where $$H_{\tau_x,\tau_y}(x, y) = \tilde{L}\left(x - \frac{\tau_x}{2}, y - \frac{\tau_y}{2}, \tau_x, \tau_y\right)W(x - \tau_x, y - \tau_y). \quad (5)$$

With $t_x=x-\tau_x/2$, $t_y=y-\tau_y/2$, Equation (5) may be as follows.

$$H_{\tau_x,\tau_y}\left(t_x + \frac{\tau_x}{2}, t_y + \frac{\tau_y}{2}\right) = \tilde{L}(t_x, t_y\tau_x, \tau_y)W\left(t_x - \frac{\tau_x}{2}, t_y - \frac{\tau_y}{2}\right) \quad (6)$$
$$= \tilde{O}_{\tau_x,\tau_y}(t_x, t_y)W\left(t_x - \frac{\tau_x}{2}, t_y - \frac{\tau_y}{2}\right),$$

where the $\tilde{O}_{\tau_x,\tau_y}(t_x,t_y)$ is a slice of the light field at an angular frequency ($\tau_x$, $\tau_y$). Equations (4) and (6) indicate that the final hologram H(x,y) is obtained by multiplying weight appropriate to the angular frequency slices $\tilde{O}_{\tau_x,\tau_y}(t_x,t_y)$ and then shifting the corresponding coordinates and accumulating it in the hologram plane.

One notable thing from Equations (4) to (6) is that the spatial sampling grid of the hologram H(x,y) is the same as the angular frequency slice $\tilde{O}_{\tau_x,\tau_y}(t_x,t_y)$ of the light field. As the spatial sampling grid of $\tilde{O}_{\tau_x,\tau_y}(t_x,t_y)$ is the same as the spatial sampling grid of the light field $L(t_x,t_y,u,v)$ itself, the WignerLFH requires high spatial sampling rate of the light field. For instance, in order to synthesize a hologram with a pixel pitch the spatial sampling pitch of the light field $L(t_x,t_y,u,v)$ should satisfy $\Delta t_x=\Delta t_y=1$ um. This requirement is hard to be met, and thus a spatial interpolation of the light field is usually required in the WignerLFH. A light field sampled in a coarse spatial grid needs to be spatially interpolated more to match the dense spatial sampling grid of the hologram, which increases the computation time significantly. Therefore, a light field with a fine spatial sampling grid is required in the WignerLFH.

A light field $L(t_x,t_y,u,v)$ is obtained either by an array of the perspective views $P_{tx,ty}(u,v)$ at different spatial positions, or an array of the orthographic views $O_{u,v}(t_x,t_y)$ at different angles. The spatial sampling pitch and the spatial pixel count of the light field are determined by the view separation and the number of views in the perspective view array. To the contrary, in the orthographic view array, they are determined by the pixel pitch and the number of the pixels in individual view. In both perspective and orthographic view array, the pixel count of individual view is usually much higher than the number of the views. Therefore, the light field given by the orthographic view array generally has finer spatial sampling grid than the perspective views.

FIGS. 2A-2B illustrate the WignerLFH processing based on Equations (4) and (6) for orthographic light field and perspective light field.

FIG. 2A illustrates the sampling grid and required spatial interpolation for the WignerLFH in a perspective light field, and FIG. 2B illustrates the sampling grid and required spatial interpolation for the WignerLFH in an orthographic light field.

In the perspective light field case, the spatial sampling grid over the $t_x$ axis of the $\tilde{L}(t_x,\tau_x)$ is not dense as shown in the middle column of FIG. 2A and thus it needs to apply intensive spatial interpolation. Then, move to the carrier wave multiplication and hologram plane accumulation step in the right column.

As shown in FIG. 2, the coarse spatial sampling grid of the perspective light field requires more spatial interpolation to match that of the target hologram, making the processing more computationally expensive. Hence, the previous WignerLFH has only been applied to orthographic light field, not the perspective one.

The orthographic view array, however, is generally hard to obtain in real 3D objects as most cameras capture perspective views. Although a light field camera that uses a micro lens array may capture the orthographic view array of the real scene, the captured orthographic views usually have low spatial resolution. Another drawback of the orthographic view array is that the size and the depth range of the objects are limited. The angular resolution given by the number of orthographic views is generally low, which restricts the available depth range small and only around the light field plane. The size of the 3D objects within the depth range is also limited to the spatial size of the light field in the corresponding plane. Therefore, the previous WignerLFH technique that relies on the orthographic view array has only been available for CG objects with a small depth and size. Hologram synthesis of real and large objects at a far distance requires the extension of the previous WignerLFH technique to the perspective light field.

FIG. 3 is a drawing for describing a non-hogel-based technique using orthographic views according to prior art.

Referring to FIG. 3, in the WignerLFH technique, the orthographic views $O_{u,v}(t_x, t_y)$ are given as an input at a u-v grid. The conventional WignerLFH technique first obtains a 4D light field $L(t_x,t_y,u,v)$ by collecting the orthographic views and Fourier transforms it along the u, v axes to obtain $\tilde{L}(t_x,t_y,\tau_x,\tau_y)$. The final hologram $H(x,y)$ is then synthesized by multiplying $\tilde{O}_{\tau_x,\tau_y}(t_x,t_y)=\tilde{L}(t_x,t_y,\tau_x,\tau_y)$ with an shifted carrier wave term $W(t_x-\tau_x/2,t_y-\tau_y/2)$ and accumulating it in the hologram plane by Equations (4) and (6).

Figure 4:
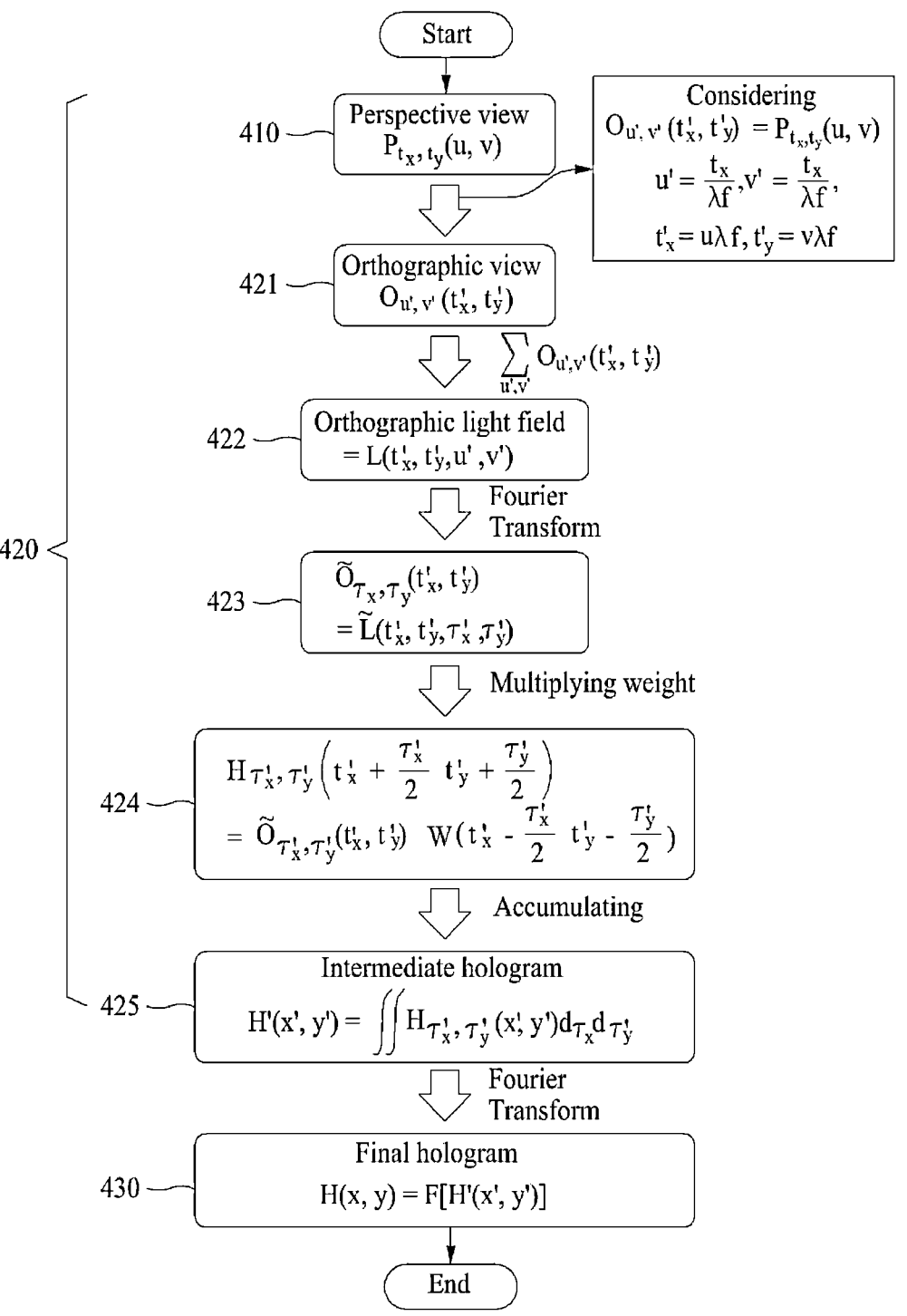
FIG. 4 is a drawing for describing a Wigner inverse transform based hologram synthesis method using large three-dimensional objects at a far distance from its perspective light field according to one example embodiment of the present disclosure.

FIG. 4 is a drawing for describing a non-hogel-based technique using perspective views according to one example embodiment of the present disclosure.

The proposed Wigner inverse transform based hologram synthesis method using large three-dimensional objects at a far distance from its perspective light field includes collecting perspective views in front focal plane corresponding to orthographic views in back focal plane 410, synthesizing an intermediate hologram in the back focal plane by using an orthographic view array without adjustment and modification of the view for the collected perspective views 420, and synthesizing a final hologram in the front focal plane corresponding to original perspective views by taking Fourier transform of the synthesized intermediate hologram 430.

In step 410, the perspective views in the front focal plane corresponding to the orthographic views in the back focal plane are collected.

In the proposed method, not the orthographic views, the perspective views $P_{tx,ty}(u,v)$ are obtained from $t_x$-$t_y$ axes.

In step 420, the intermediate hologram in the back focal plane is synthesized by treating and using the collected perspective views as orthographic views without adjustment and modification of the views for the collected perspective views.

The key procedure of the proposed method is to treat the perspective view $P_{tx,ty}(u,v)$ as the orthographic views $O_{u',v'}(t'_x, t'_y)=P_{tx,ty}(u,v)$ without adjustment and modification of any view 421. The parameters are defined as $u'=-t_x/\lambda f$, $v'=t_y/\lambda f$, $t'_x=u\lambda f$, and $t'_y=v\lambda f$ with the focal length f. Then, the intermediate hologram is synthesized by using $O_{u',v'}(t'_x, t'_y)$ array following the conventional procedure of the WignerLFH technique explained above. After orthographic light field $L(t'_x,t'_y,u',v')$ is obtained 422, $\tilde{L}(t'_x, t'_y, \tau'_x, \tau'_y)$ is obtained through Fourier transform along u', v' axes 423. Then, by using multiplying weight, $\tilde{O}_{\tau'_x,\tau'_y}(t'_x, t'_y)=\tilde{L}(t'_x, t'_y, \tau'_x, \tau'_y)$ is multiplied with an shifted carrier wave term $W(t'_x-\tau'_x/2,t'_y-\tau'_y/2)$ 424, and accumulated in the hologram plane, and the intermediate hologram is obtained 425.

In step 430, finally, the final hologram $H(x,y)$ is obtained by taking Fourier transform of $H'(x', y')$ with $x/\lambda f$ and $y/\lambda f$ being the spatial frequency of x' and y'. Therefore, the proposed method is nothing but considering the perspective views as orthographic views, and then taking an additional Fourier transform compared to the existing method.

Figure 5:
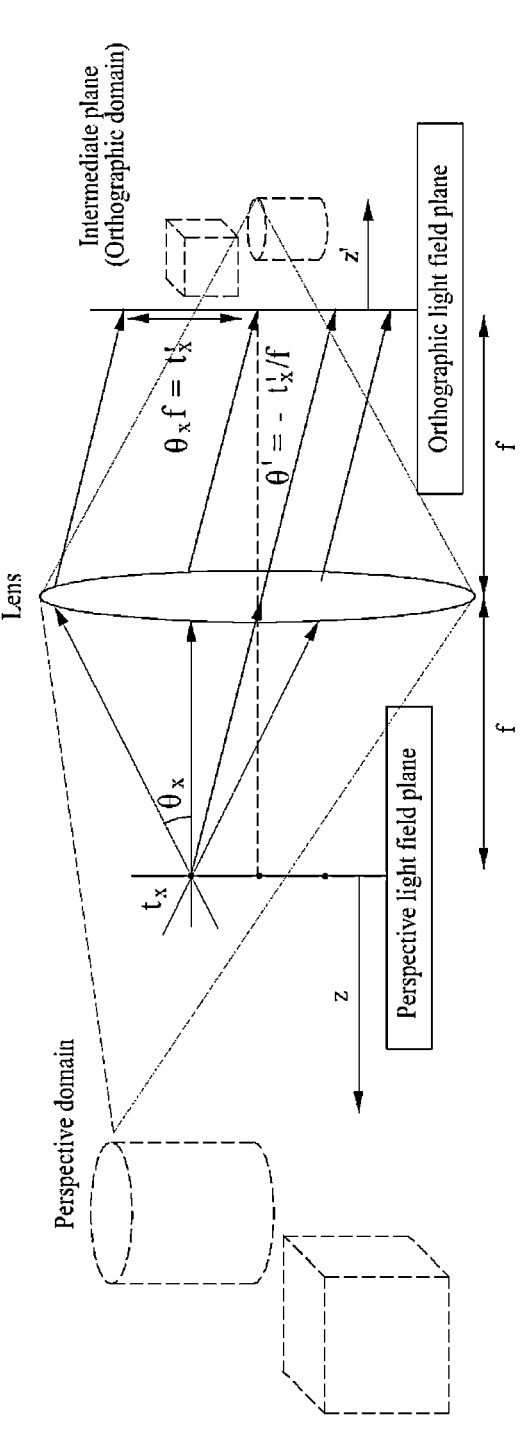
FIG. 5 is a drawing for describing perspective-orthographic plane relationship according to one example embodiment of the present disclosure.

FIG. 5 is a drawing for describing perspective-orthographic plane relationship according to one example embodiment of the present disclosure.

The proposed method may be easily understood from a 2f configuration shown in FIG. 5. As shown in FIG. 5, the light rays of a perspective viewpoint at $t_x$ in the front focal plane is collimated in the back focal plane forming the corresponding orthographic views. Therefore, a perspective views $P_{tx,ty}(u,v)$ in the front focal plane may be treated as the orthographic views $O_{u',v'}(t'_x, t'_y)$ in the back focal plane with $t'_x \approx \theta_x f \approx u\lambda f$ and $t'_y \approx \theta_y f \approx v\lambda f$. Note that there is no actual image modification for each view in this step. By applying the WignerLFH technique with the orthographic views $O_{u',v'}(t'_x, t'_y)$, an intermediate hologram $H'(x',y')$ in the back focal plane is synthesized. Finally, the desired hologram in the front focal plane corresponding to the original perspective views is obtained by taking Fourier transform of $H'(x', y')$ with $x/\lambda f$ and $y/\lambda f$.

The focal length f of the 2f configuration may be chosen arbitrarily in the proposed method. The focal length f determines the orthographic view array sampling grid in the back focal plane and it also determines the magnification of the object image. Suppose that the original object is located at a distance z as shown in FIG. 5 and the perspective light field in the front focal plane of the 2f configuration has a spatial and angular sampling pitch $\Delta f_x$ and $\Delta\theta_x$. The minimum spatial size of the discernible spot supported by the perspective light field is given by $\Delta\xi_x=\max(\Delta t_x,z\Delta\theta_x)$. It is assumed that this is smaller than the minimum feature size of the original object, which means the original perspective light field has sufficient sampling density to represent the object. By the 2f configuration, the object is imaged at a distance $z'=f^2/z$ from the back focal plane with a lateral magnification $m_f=(z'+f)/(z+f)=f/z$. At the same time, the orthographic view array in the back focal plane has the spatial and angular sampling pitch $\Delta t_x'=f\Delta\theta_x$ and $\Delta\theta_x'=\Delta t_x/f$, which gives the minimum spatial spot size by $\Delta\xi_x'=\max(\Delta t'_x,z'\Delta\theta'_x)=\max\{f\Delta\theta_x,(f^2/z)\Delta t_x/f\}=m_f\cdot\max(z\Delta\theta_x,\Delta t_x)=m_f\Delta\xi_x$. Therefore, both the object image and the minimum spatial spot size of the light field are scaled with the same factor $m_f$, and the light field sampling condition is maintained regardless of the choice of the focal length f.

The shortcomings of the orthographic light field described above are two folds. One is that the orthographic view is hard to be captured for real existing objects with sufficient spatial resolution. Another one is that the orthographic light field has limitations in the object depth and size. These two shortcomings are overcome in the proposed method. As the perspective light field is used instead of the orthographic view, the light field of real existing objects may be easily obtained by using for instance a camera array. Instead of naively increasing the sampling rate of the orthographic light field to support large objects at a far distance, the proposed method uses the perspective light field which better represents the large and far objects at the same light field sampling grid and transforms it to the orthographic light field in the back focal plane of the 2f configuration. The original objects in the far distance from the perspective view plane, i.e., the front focal plane, are imaged around the orthographic view plane or the back focal plane with minification, satisfying the depth range and the size limitation of the perspective view plane light field, and enabling the synthesis of the intermediate hologram without aliasing. Therefore, the proposed method may synthesize the far and large objects without the increasing the sampling grid exhaustively. Finally, the proposed method only requires a single additional Fourier transform over the conventional WignerLFH method for the perspective views, which makes it computationally efficient. Therefore, the proposed method efficiently generates the hologram of large objects at a far distance represented in perspective view array without sampling problem. The perspective light field format of the proposed method enables the hologram synthesis of not only CG objects but also real existing objects.

Figure 6:
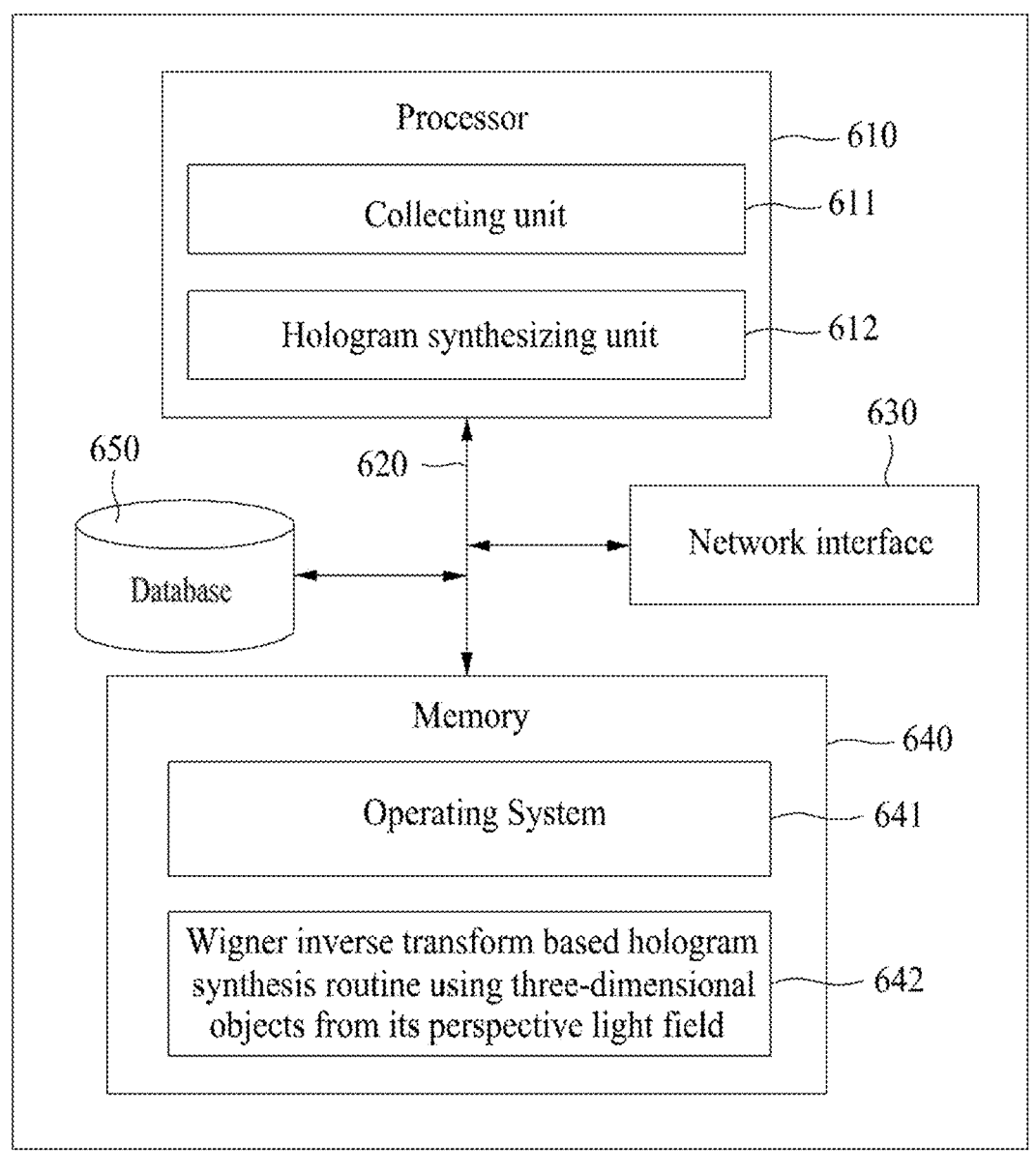
FIG. 6 is a drawing illustrating a configuration of a Wigner inverse transform based hologram synthesis system using large three-dimensional objects at a far distance from its perspective light field according to one example embodiment of the present disclosure.

FIG. 6 is a drawing illustrating a configuration of a Wigner inverse transform based hologram synthesis system using large three-dimensional objects at a far distance from its perspective light field according to one example embodiment of the present disclosure.

A hologram synthesis system 600 according to one example embodiment may include a processor 610, a bus 620, a network interface 630, a memory 640, and a database 650. The memory 640 may include an operating system (OS) 641 and a Wigner inverse transform based hologram synthesis routine using three-dimensional objects at a far distance from its perspective light field 642. The processor 610 may include a collecting unit 611 and a hologram synthesizing unit 612. The hologram synthesis system 600 in other example embodiments may include more components than the components in FIG. 6. However, there is no need to clearly illustrate most of conventional components. For example, the hologram synthesis system 600 may include other components such as a display or a transceiver.

The memory 640 may include a permanent mass storage device such as RAM (random access memory), ROM (read only memory), and disk drive as computer-readable recording medium. Also, in the memory 640, a program code for the OS 641 and the Wigner inverse transform based hologram synthesis routine using three-dimensional objects at a far distance from its perspective light field 642 may be stored. Such software components may be loaded from another computer-readable medium separate from the memory 640 by using a drive mechanism (not shown). Such separate computer-readable recording medium may include computer-readable medium (not shown) such as a floppy drive, a disc, a tape, a DVD/CD-ROM drive, a memory card, and the like. In other example embodiments, software components may be loaded to the memory 640 through the network interface 630, not through the computer-readable medium.

The bus 620 enables communication and data transmission between components of the hologram synthesis system 600. The bus 620 may be configured by using a high-speed serial bus, a parallel bus, a SAN (Storage Area Network) and/or other appropriate communication technologies.

The network interface 630 may be a computer hardware component for connecting the hologram synthesis system 600 to a computer network. The network interface 630 may connect the hologram synthesis system 600 to a computer network through wireless or wired connection.

The database 650 may serve to store and maintain all information required for Wigner inverse transform based hologram synthesis using three-dimensional objects at a far distance from its perspective light field. Although FIG. 6 illustrates that the database 650 is constructed and included inside the hologram synthesis system 600, it is not limited thereto, and it may be omitted according to system implementation methods or environments or it is also possible that all or part of the database exists as an external database constructed on a separate system.

The processor 610 may be configured to process computer program instructions by performing basic arithmetic, logic, and input/output operation of the hologram synthesis system 600. The instructions may be provided to the processor 610 by the memory 640 or the network interface 630, and through the bus 620. The processor 610 may be configured to execute a program code for the collecting unit 611 and the hologram synthesizing unit 612. Such program code may be stored in a storage device such as the memory 640.

The collecting unit 611 and the hologram synthesizing unit 612 may be configured to perform steps 410 to 430 in FIG. 4.

The hologram synthesis system 600 may include the collecting unit 611 and the hologram synthesizing unit 612.

The collecting unit 611 according to one example embodiment of the present disclosure collects perspective views in front focal plane corresponding to orthographic views in back focal plane.

For the collecting unit 611 according to one example embodiment of the present disclosure, not the orthographic views, the perspective views $P_{tx,ty}(u,v)$ are obtained from $t_x$–$t_y$ axes.

The hologram synthesizing unit 612 according to one example embodiment of the present disclosure synthesizes the intermediate hologram in the back focal plane by using an orthographic view array without adjustment and modification of the view for the collected perspective views.

The key procedure of the proposed method is to treat the perspective views $P_{tx,ty}(u,v)$ as the orthographic views $O_{u',v'}(t'_x, t'_y)=P_{tx,ty}(u,v)$ without adjustment and modification of any view. The parameters are defined as $u'=-t_x/\lambda f$, $v'=t_y/\lambda f$, $t'_x=u\lambda f$, and $t'_y=v\lambda f$ with the focal length f. Then, the intermediate hologram H'(x',y') is synthesized by using $O_{u',v'}(t'_x, t'_y)$ array following the conventional procedure of the WignerLFH technique explained above. After orthographic light field $L(t'_x,t'_y,u',v')$ is obtained, $\tilde{L}(t'_x, t'_y, \tau'_x, \tau'_y)$ is obtained through Fourier transform along u', v' axes. Then by using multiplying weight, $\tilde{O}_{\tau'_x,\tau'_y}(t'_x, t'_y)=\tilde{L}(t'_x, t'_y, \tau'_x, \tau'_y)$ is multiplied with a shifted carrier wave term $W(t'_x-\tau'_x/2, t'_y-\tau'_y/2)$ and accumulated it in the hologram plane, and the intermediate hologram is obtained.

The hologram synthesizing unit 612 according to one example embodiment of the present disclosure, finally, obtains the final hologram H(x,y) by taking Fourier transform of H'(x',y') with x/$\lambda f$ and y/$\lambda f$ being the spatial frequency of x' and y'. Therefore, the proposed method is nothing but considering the perspective views as orthographic ones, and then taking an additional Fourier transform compared to the existing method.

Figure 7:
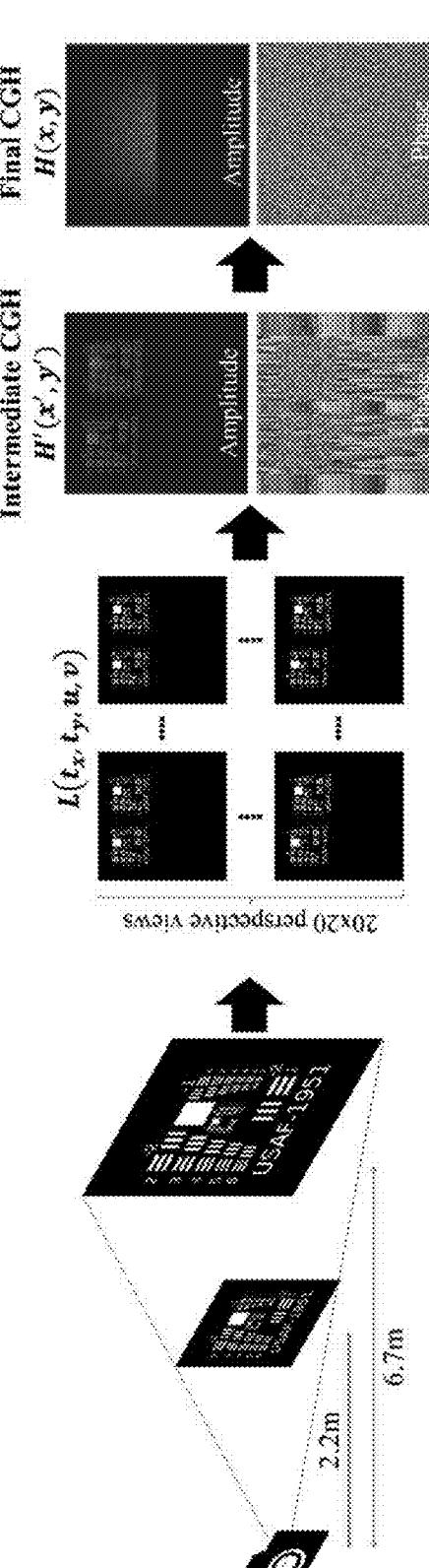
FIG. 7 is a drawing illustrating a synthesis result of perspective light field of two resolution targets and intermediate and final holograms according to one example embodiment of the present disclosure.

FIG. 7 is a drawing illustrating a synthesis result of perspective light field of two resolution targets and intermediate and final holograms according to one example embodiment of the present disclosure.

The proposed method is verified by numerical simulations and optical experiments. In the simulation and experiment, perspective light field of two resolution target objects located at 2.2 m and 6.7 m distances is used. The two resolution target objects have the same angular size as depicted in the left part of FIG. 7. The light field consists of 20×20 perspective views as shown in the middle part of FIG. 7. Each perspective view has 1500×1500 pixel count and 7.95° field of view which corresponds to 0.0053° angular pitch or $\Delta u=\Delta v=178.2538$ m$^{-1}$ for $\lambda=520$ nm. The spatial separation between the perspective views is $\Delta t_x=\Delta t_y=0.62$ mm. With f=0.1 m, the proposed method has $\Delta t'_x=\Delta t'_y=9.27$ μm and 0.357° angular pixel pitch or $\Delta u'=\Delta v'=1.2\times10^4$ m$^{-1}$ in the intermediate plane. The intermediate hologram H'(x', y') is synthesized from the orthographic view as shown in the third part of FIG. 7. In the intermediate hologram synthesis, a random phase distribution is used as a carrier wave W in Equation (6), to obtain wide viewing angle and natural blur of unfocused object. Different carrier waves may also be used including a uniform, linear, spherical, and arbitrary wave as some of them are demonstrated below. Also, each orthographic view in the intermediate plane is interpolated during the intermediate hologram synthesis to reduce the original spatial sampling pitch $\Delta t_x'=\Delta t_y'=9.27$ μm to 4.17 μm. This ensures that the diffraction angle of the synthesized intermediate hologram matches to the angular range of the orthographic views in the same plane. The lower half of the intermediate hologram is forced to zero following the single side band encoding technique to separate the reconstruction from the DC and conjugate images in the optical experiment. The synthesized intermediate hologram has $\Delta x'=\Delta y'=4.17$ μm pixel pitch and 3.5K×3.5K pixel count. The final hologram H(x,y) in the original perspective light field plane is obtained by taking Fourier transform of the intermediate hologram H'(x',y'). The pixel pitch and pixel count of the final hologram are $\Delta x=\Delta y=3.74$ μm and 3.5K×3.5K, respectively.

FIG. 8 is a drawing illustrating numerical reconstruction results according to one example embodiment of the present disclosure.

Figure 8A:
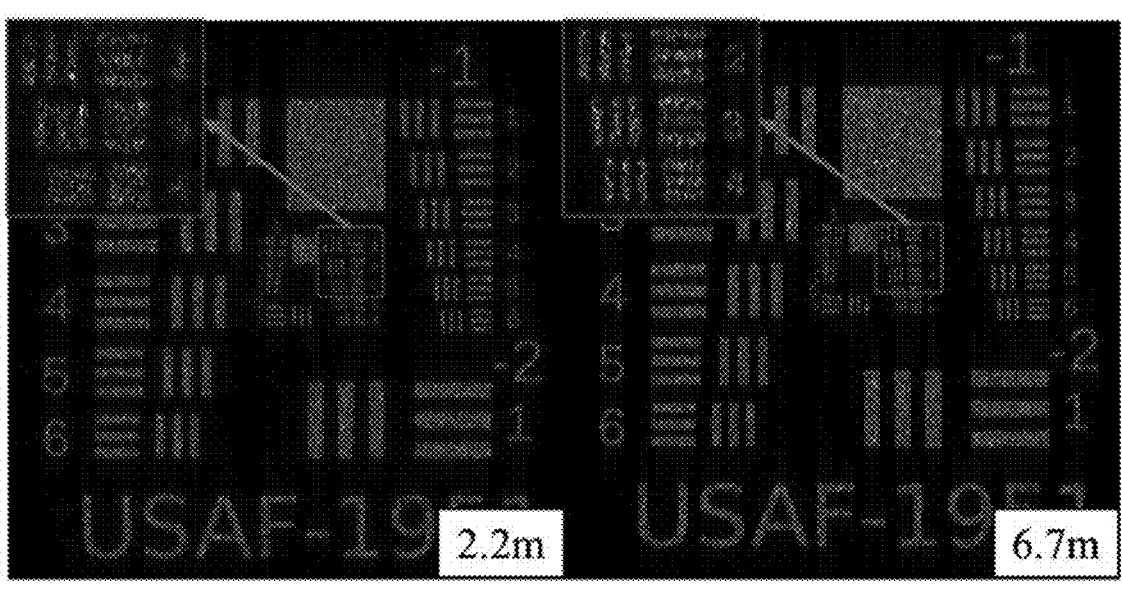
FIG. 8A is a drawing illustrating numerical reconstruction results according to one example embodiment of the present disclosure.
Figure 8B:
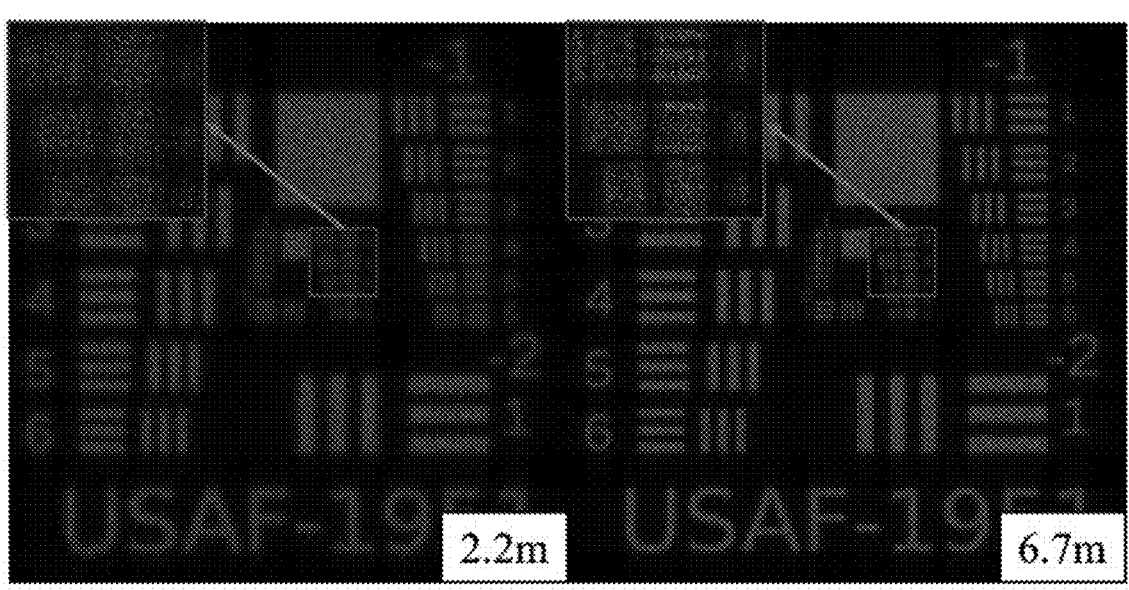
FIG. 8B is a drawing illustrating numerical reconstruction results according to conventional hogel-based stereogram.

For numerical reconstruction over a large distance, single Fast Fourier transform (FFT) based propagation $FFT\{H(x, y)exp\{j(\pi/\lambda z)(x^2+y^2)\}\}|_{\xi/\lambda z,\eta/\lambda z}$ where the propagated field $G(\xi,\eta;z)$ is given is used. For a resolution comparison, the conventional hogel-based stereogram is also synthesized from the same perspective light field. To keep the same hologram pixel count and pitch, the original of 20×20 perspective views with 1500×1500 pixel count is reduced to 7×7 perspective views with 500×500 pixel count in the conventional stereogram case. As the proposed method is based on the conventional WignerLFH technique in its intermediate hologram synthesis steps, the produced hologram is expected to have higher reconstruction quality than the traditional hogel-based stereograms. FIG. 8 shows the reconstruction results. The actual reconstruction size of the 6.7 m distance resolution target is larger than that of the 2.2 m target as they have the same angular size as illustrated in FIG. 5. The size of the reconstruction result shown in FIG. 8 is normalized and thus FIG. 8 represents the angular resolution of the reconstruction. As shown in FIG. 8A, the hologram synthesized by the proposed method reconstructs the far objects at 2.2 m and 6.7 m successfully. Comparison with FIG. 8B also reveals that the proposed technique provides much higher reconstruction resolution than the conventional hogel-based stereogram at the same hologram pixel count as it is free from the space-angular resolution trade-off of the conventional stereogram.

The aforementioned device may be implemented as a hardware component, a software component, and/or a combination of a hardware component and a software component. For example, the device and component described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. The processing device may perform an operating system (OS) and one or more software applications that are executed on the OS. Furthermore, the processing device may access, store, manipulate, process, and generate data in response to the execution of software. For convenience of understanding, one processing device has been illustrated as being used, but a person having ordinary knowledge in the art may understand that the processing device may include a plurality of processing elements and/or a plurality of types of processing elements. For example, the processing device may include a plurality of processors or one processor and one controller.

Furthermore, another processing configuration, such as a parallel processor, is also possible.

Software may include a computer program, a code, an instruction or a combination of one or more of them, and may configure a processing device so that the processing device operates as desired or may instruct the processing devices independently or collectively. The software and/or the data may be embodied in any type of machine, a component, a physical device, virtual equipment, or a computer storage medium or device in order to be interpreted by the processing device or to provide an instruction or data to the processing device. The software may be distributed to computer systems that are connected over a network, and may be stored or executed in a distributed manner. The software and the data may be stored in one or more computer-readable recording media.

The method according to an embodiment may be implemented in the form of a program instruction executable by various computer means and stored in a computer-readable medium. The computer-readable recording medium may include a program instruction, a data file, and a data structure solely or in combination. The program instruction recorded on the medium may be specially designed and constructed for an embodiment, or may be known and available to those skilled in the computer software field. Examples of the computer-readable recording medium include magnetic media such as a hard disk, a floppy disk and a magnetic tape, optical media such as CD-ROM and a DVD, magneto-optical media such as a floptical disk, and hardware devices specially configured to store and execute a program instruction, such as ROM, RAM, and a flash memory. Examples of the program instruction include a high-level language code executable by a computer by using an interpreter in addition to a machine-language code, such as that written by a compiler.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned components, such as a system, a structure, a device, and a circuit, are coupled or combined in a form different from that of the described method or replaced or substituted with other components or equivalents thereof.

Accordingly, other implementations, other embodiments, and the equivalents of the claims fall within the scope of the claims.

The invention claimed is:

1. A hologram synthesis method, comprising:

a) obtaining perspective views for a three dimensional object at a distance by capturing light field data at spatial coordinates and angular coordinates expressed as spatial frequencies of light ray angles in a front focal plane at a focal length in front of a lens;

b) synthesizing an intermediate hologram comprising:

using the perspective views as an orthographic view array in a back focal plane at the focal length behind the lens;

performing a Wigner inverse Fourier transform on the orthographic view array to obtain an orthographic light field;

multiplying the orthographic light field with a carrier wave; and

accumulating the multiplied orthographic light field at
shifted spatial coordinates to form the intermediate
hologram; and c) synthesizing a final hologram in the front focal plane by
performing a Fourier transform using a spatial fre-
quency for the synthesized intermediate hologram.

2. The hologram synthesis method of claim 1, wherein the
carrier wave comprises a random phase distribution to
obtain a wide viewing angle and natural blur of an unfocused
object.

3. The hologram synthesis method of claim 1, wherein the
carrier wave comprises a uniform, linear, spherical, or
arbitrary wave for illuminating the object.

4. A hologram synthesis method, comprising:

a) obtaining perspective views $P_{tx,ty}(u, v)$ for a three
dimensional object by capturing light field data at
spatial coordinates along (tx, ty) axes and angular
coordinates expressed as spatial frequencies (u, v) of
light ray angles $(\theta_x, \theta_y)$ in a front focal plane at a focal
length (f) in front of a lens;

b) synthesizing an intermediate hologram by using the
obtained perspective views $P_{tx,ty}(u,v)$ as an ortho-
graphic view array $O_{u',v}(t'x, t'y)$ in a back focal plane
at the focal length (f) behind the lens and performing a
Wigner inverse Fourier transform on the orthographic
view array,
wherein u=sin $\theta_x/\lambda$ and v=sin $\theta_y/\lambda$,
wherein u'=−tx/$\lambda$f and v'=−ty/$\lambda$f,
wherein t'x=u$\lambda$f and t'y=v$\lambda$f, and
wherein $\lambda$ is a wavelength; and c) synthesizing a final hologram in the front focal plane by
performing a Fourier transform of the synthesized
intermediate hologram with spatial frequencies x/$\lambda$f
and y/$\lambda$f.

5. The hologram synthesis method of claim 4, wherein the
synthesizing an intermediate hologram comprises:
using the perspective views $P_{tx,ty}(u, v)$ as the orthographic
array $O_{u',v}(t'x, t'y)$;

14 performing a Wigner inverse Fourier transform on the
orthographic view array to obtain an orthographic light
field;

multiplying the orthographic light field with a carrier
wave; and accumulating the multiplied orthographic light field at
shifted spatial coordinates to form the intermediate
hologram.

6. The hologram synthesis method of claim 5, wherein the
carrier wave comprises an arbitrary complex field for illu-
minating the object.

7. The hologram synthesis method of claim 5, wherein the
carrier wave comprises a random phase distribution to
obtain a wide viewing angle and natural blur of an unfocused
object.

8. The hologram synthesis method of claim 5, wherein the
carrier wave comprises a uniform, linear, spherical, or
arbitrary wave for illuminating the object.

9. The hologram synthesis method of claim 4, wherein
obtaining the perspective views is by using a camera array.

10. A hologram synthesis system, comprising:
a collecting unit configured to collect perspective views in
a front focal plane; and
a hologram synthesizing unit configured to:
obtain perspective views for a three dimensional object
at a distance by capturing light field data at spatial
coordinates and angular coordinates expressed as
spatial frequencies of light ray angles in a front focal
plane at a focal length in front of a lens;
synthesize an intermediate hologram by using the
obtained perspective views as an orthographic view
array in a back focal plane at the focal length behind
the lens and performing in a Wigner inverse Fourier
transform on the orthographic view array to obtain
an orthographic light field; and
synthesize a final hologram in the front focal plane by
performing a Fourier transform using a spatial fre-
quency for the synthesized intermediate hologram.

* * * * *